United States Patent
Nakajima

(10) Patent No.: US 10,228,882 B2
(45) Date of Patent: Mar. 12, 2019

(54) SEMICONDUCTOR DEVICE AND MEMORY ACCESS CONTROL METHOD

(71) Applicant: RENESAS ELECTRONICS CORPORATION, Tokyo (JP)

(72) Inventor: Masami Nakajima, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 118 days.

(21) Appl. No.: 15/370,771

(22) Filed: Dec. 6, 2016

(65) Prior Publication Data

US 2017/0168757 A1 Jun. 15, 2017

(30) Foreign Application Priority Data

Dec. 10, 2015 (JP) .................. 2015-240815

(51) Int. Cl.
*G06F 3/06* (2006.01)
*G06F 9/48* (2006.01)
*G06F 12/0868* (2016.01)
*G06F 12/0897* (2016.01)

(52) U.S. Cl.
CPC .......... *G06F 3/0659* (2013.01); *G06F 3/0625* (2013.01); *G06F 3/0685* (2013.01); *G06F 9/4812* (2013.01); *G06F 12/0868* (2013.01); *G06F 12/0897* (2013.01); *G06F 2212/1021* (2013.01); *G06F 2212/202* (2013.01); *Y02D 10/13* (2018.01)

(58) Field of Classification Search
CPC .... G06F 3/0659; G06F 3/0625; G06F 3/0685; G06F 9/4812; G06F 12/0868; G06F 12/0897; G06F 2212/1021; G06F 2212/202; Y02D 10/13
See application file for complete search history.

(56) References Cited

U.S. PATENT DOCUMENTS 4,602,327 A * 7/1986 LaViolette ............ G06F 13/364
710/107
5,127,089 A * 6/1992 Gay ........................ G06F 15/17
710/108

(Continued)

FOREIGN PATENT DOCUMENTS

JP 2015-022330 A 2/2015

*Primary Examiner* — Mano Padmanabhan
*Assistant Examiner* — William E. Baughman
(74) *Attorney, Agent, or Firm* — McDermott Will & Emery LLP

(57) ABSTRACT

A semiconductor device according to the present invention includes: a memory unit provided with a lower-order memory and a cache memory to cache a data stored in the lower-order memory; a power control circuit to control power supply of the lower-order memory; and a bus master to access the data stored in the memory unit after locking the bus. When the power supply of the lower-order memory is cut off at the time of occurrence of a mishit of the cache memory, the power control circuit restores the power supply of the lower-order memory, and the memory unit outputs a response to the access to the bus master. The bus master once releases the lock of the bus according to the response from the memory unit and reexecutes the access with the bus locked, after the restoration of the power supply of the lower-order memory is completed.

11 Claims, 12 Drawing Sheets

(56) References Cited

U.S. PATENT DOCUMENTS

| | | | | |
|---|---|---|---|---|
| 5,210,867 A | * | 5/1993 | Barlow | G06F 11/1402 |
| | | | | 714/17 |
| 6,389,519 B1 | * | 5/2002 | Thusoo | G06F 13/4217 |
| | | | | 711/152 |
| 6,598,104 B1 | * | 7/2003 | Jaramillo | G06F 13/364 |
| | | | | 710/107 |
| 2003/0126381 A1 | * | 7/2003 | Vo | G06F 9/526 |
| | | | | 711/152 |
| 2016/0132430 A1 | | 5/2016 | Nomura et al. | |

* cited by examiner

SEMICONDUCTOR DEVICE AND MEMORY ACCESS CONTROL METHOD

CROSS-REFERENCE TO RELATED APPLICATIONS

The disclosure of Japanese Patent Application No. 2015-240815 filed on Dec. 10, 2015 including the specification, drawings and abstract is incorporated herein by reference in its entirety.

BACKGROUND

The present invention relates to a semiconductor device and a memory access control method and relates to the technology which is useful for a bus master accessing a memory unit after locking a bus, for example.

Patent Literature 1 discloses a memory control circuit which aims at performing the efficient power control of a cache memory by techniques other than the power management performed by an operating system. The memory control circuit counts up a read request counter when a read request from a first-order cache memory to a second-order cache memory is issued, and counts down the read request counter when the second-order cache memory responds to the first-order cache memory, responding to the request. The memory control circuit activates an L2 non-operation counter, when the count value of the read request counter becomes zero. The memory control circuit cuts off the power supply of the L2 cache, when the count value of the L2 non-operation counter exceeds a prescribed value determined in advance.

(Patent Literature 1) Japanese Unexamined Patent Application Publication No. 2015-22330

SUMMARY

However, according to the technology disclosed by Patent Literature 1, when a bus access accompanied by a cache miss is performed to the L1 cache from the bus master after the power supply of the L2 cache cut off, it is difficult to complete the bus access and to return a response to the bus master until the power supply of the L2 cache is restored and the read of data stored in the L2 cache becomes possible.

Therefore, the completion of the bus access will take a long period and the bus is kept locked by the bus access during this period. Namely, it will become difficult to execute other bus accesses for the long period. Accordingly, it becomes difficult for the bus master which has performed the bus access or other bus masters to quickly execute urgent processing accompanied by a bus access (for example, processing accompanied by a bus access responding to an interrupt). This situation causes a problem.

The other issues and new features of the present invention will become clear from the description of the present specification and the accompanying drawings.

In a semiconductor device according to one embodiment, when the power supply of a lower-order memory is cut off at the time of occurrence of a mishit of the cache memory in an access from a bus master, a power control circuit restores the power supply of the lower-order memory, a memory unit outputs a response to the access to the bus master, and the bus master once releases the lock of the bus according to the response from the memory unit and reexecutes the access with the bus locked, after the restoration of the power supply of the lower-order memory completed.

According to the one embodiment, it is possible to realize low power consumption of the memory, and at the same time, it is possible for the bus master to execute urgent processing accompanied by a bus access more quickly.

DETAILED DESCRIPTION

Hereinafter, preferred embodiments are explained with reference to drawings. Concrete numerical values illustrated in the following embodiments are only an illustration for facilitating understanding of the embodiments, and are not restricted to the values except when it is otherwise specified clearly. In the following descriptions and drawings, an abbreviation and simplification are properly made about what is obvious for a person skilled in the art for clarification of explanation.

Embodiment 1

Figure 1:
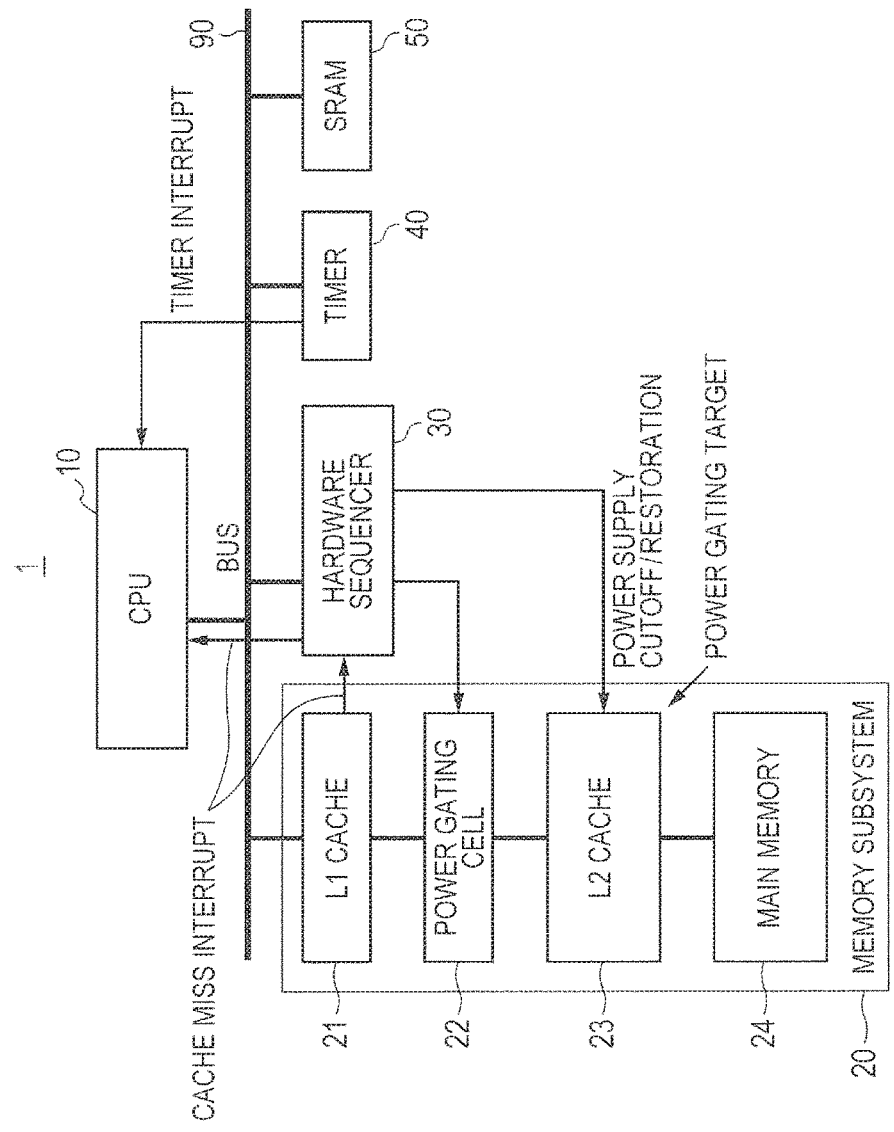
FIG. 1 is a drawing illustrating the configuration of a semiconductor device according to Embodiment 1.

First, with reference to FIG. 1, the configuration of a semiconductor device 1 according to Embodiment 1 is explained. As illustrated in FIG. 1, the semiconductor device 1 includes a CPU (Central Processing Unit) 10, a memory subsystem 20, a hardware sequencer 30, a timer 40, and an SRAM (Static Random Access Memory) 50.

This semiconductor device 1 can be implemented in various devices, including a PC (Personal. Computer), a Smartphone, information processing devices such as a tablet and a wearable computer, electrical household appliances and electrical equipment, and a control device in a factory.

The CPU 10, the memory subsystem 20, the hardware sequencer 30, the timer 40, and the SRAM 50 are mutually coupled via a bus 90.

The feature of the configuration of the semiconductor device 1 according to Embodiment 1 is shown in the following.
Memory without power supply gating=L1 cache 21
Memory with power supply gating=L2 cache 23
Bus master=CPU 10
Power control module=hardware sequencer 30
Trigger of power supply cutoff=timer interrupt
Trigger of power supply restoration=cache miss interrupt The CPU 10 is a processing unit which executes processing to control the semiconductor device 1 with the use of data stored in a main memory 24. For example, the main memory 24 stores data used in calculation by the CPU 10, and a program which makes the CPU 10 execute the above-described processing to control the semiconductor device 1. The CPU 10 executes the above-described processing to control the semiconductor device 1 by executing the program stored in the main memory 24.

Usually, the CPU 10 directly reads and uses the data and the program which are stored in the main memory 24, without loading them to the SRAM 50. However, if needed, the CPU 10 may load the data stored in the main memory 24 to the SRAM 50, and may execute the processing using the data loaded to the SRAM 50. In this case, the CPU 10 loads the program properly from the main memory 24 to the SRAM 50 and executes it.

That is, the CPU 10 is a bus master which accesses a bus slave (the memory subsystem 20, the hardware sequencer 30, the timer 40, and the SRAM 50, etc.) via the bus 90.

The memory subsystem 20 includes an L1 cache 21, a power gating cell 22, an L2 cache 23, and a main memory 24. The L1 cache 21 and the L2 cache 23 are coupled via the power gating cell 22. The L2 cache 23 is coupled to the main memory 24.

The L1 cache 21 is a cache memory to which a part of the data stored in the main memory 24 is cache d. When read of data of a certain address in the main memory 24 is requested by the CPU 10 to the memory subsystem 20, and when the data of the address is cache d in the L1 cache 21 itself (that is, when the L1 cache 21 is hit), the L1 cache 21 outputs the data stored in itself to the CPU 10, and notifies the completion of the read of data to the CPU 10. On the other hand, when the read of data of a certain address in the main memory 24 is requested by the CPU 10 to the memory subsystem 20, and when the data of the address is not cache d in the L1 cache 21 itself (that is, when the L1 cache 21 is mishit), the L1 cache 21 requests the read of the data of the address from the L2 cache 23.

The power gating cell 22 is enabled by the hardware sequencer 30 before the power supply of the L2 cache 23 is cut off. The power gating cell 22 is a circuit which performs processing to prevent the node of the L1 cache 21 from becoming an intermediate potential, while the power gating cell 22 is enabled by the hardware sequencer 30, even when the power supply of the L2 cache 23 is cut off. The power gating cell 22 is disabled by the hardware sequencer 30 after performing the power supply restoration of the L2 cache 23. The power gating cell 22 does not perform the above-described processing which prevents the node of the L1 cache 21 from becoming an intermediate potential, while the power gating cell 22 is disabled by the hardware sequencer 30.

The L2 cache 23 is a cache memory to which a part of the data stored in the main memory 24 is cache d. The L2 cache 23 is a lower level memory than the L1 cache 21, and can cache more pieces of data than the L1 cache 21. In other words, a part of the data stored in the L2 cache 23 is cache d to the L1 cache 21.

When read of data of a certain address from the L1 cache 21 is requested by the CPU 10 to the memory subsystem 20, and when the data of the address is cache d in the L2 cache 23 itself (that is, when the L2 cache 23 is hit), the L2 cache 23 outputs the data stored in itself to the L1 cache 21. In this case, the L1 cache 21 outputs the data outputted from the L2 cache 23 to the CPU 10 and notifies the completion of the read of data to the CPU 10. The L1 cache 21 caches to itself the data outputted from the L2 cache 23.

On the other hand, when read of data of a certain address in the main memory 24 is requested from the L1 cache 21, and when the data of the address is not cache d in the L2 cache 23 itself (that is, when the L2 cache 23 is mishit), the L2 cache 23 requests the read of the data of the address from the main memory 24.

As described above, the main memory 24 stores the data used by the CPU 10. The main memory 24 is a lowest level memory in the memory subsystem 20, and does not cache the data of other memories. The main memory 24 is a DRAM (Dynamic Random Access Memory) or an NVM (Non-Volatile Memory), for example.

When read of data of a certain address is requested by the L2 cache 23, the main memory 24 outputs the data of the address to the L2 cache 23. In this case, the L2 cache 23 caches to itself the data outputted from the main memory 24 and outputs it to the L1 cache 21. The L1 cache 21 outputs the data outputted from the L2 cache 23 to the CPU 10 and notifies the completion of the read of data to the CPU 10. The L1 cache 21 caches to itself the data outputted from the L2 cache 23.

When the completion of the read of data is notified from the memory subsystem 20 (the L1 cache 21), the CPU 10 acquires the data currently outputted from the memory subsystem 20 (the L1 cache 21) as the data read from the memory subsystem 20.

The hardware sequencer 30 is a circuit which controls the power on/off state of the L2 cache 23. More specifically, the hardware sequencer 30 can perform the power supply cutoff (power OFF) of the L2 cache 23, and the power supply restoration (power ON) of the L2 cache 23. The hardware sequencer 30 controls an enabling/disabling state of the power gating cell 22, as described above. More specifically, the hardware sequencer 30 can perform enabling of the power gating cell 22, and disabling of the power gating cell 22.

The timer 40 is a circuit which measures the passage of time set up by the CPU 10 based on the instructions from the CPU 10 and notifies the CPU 10 when the set-up time has passed. The timer 40 outputs to the CPU 10 a timer interrupt signal as the notice when the time set up by the CPU 10 has passed.

The SRAM 50 is a memory which stores the data used by the CPU 10, as described above.

The bus 90 includes an address line (address bus), a data line (data bus), and a control line (control bus). As described above, when the CPU 10 requests the memory subsystem 20 for the read of data stored at a certain address in the main memory 24, the CPU 10 outputs the address data indicative of the address to the memory subsystem 20 via the address line, and outputs the read request data indicative of the read being requested, to the memory subsystem 20 via the control line.

When the read request data is inputted from the CPU 10 via the control line, the L1 cache 21 performs processing to acquire the data of the address indicated by the address data inputted from the CPU 10 via the address line, from the L1 cache 21 itself, the L2 cache 23, or the main memory 24, as described above. The L1 cache 21 outputs the acquired data to the CPU 10 via the data line, and outputs the read completion data indicating that the read of data has completed, to the CPU 10 via the control line.

Here, the CPU 10 locks the bus 90 from the time when the read request data is outputted to the memory subsystem 20 until the time when the read completion data is inputted from the memory subsystem 20. More specifically, the CPU 10 starts the output of the bus lock signal via the control line, before outputting the read request data, and terminates the output of the bus lock signal after the read completion data is inputted. The bus master suppresses the access to other circuits (other bus masters or bus slaves) via the bus 90, while the bus lock signal is inputted into the bus master itself via the control line. According to this configuration, it is made sure to avoid cases where the access to the bus 90 by several bus masters conflicts.

On the other hand, as described above, when the L1 cache 21 is mishit in the state where the power supply of the L2 cache 23 is cut off, if it is set such that the L1 cache 21 requests the read of data to the L2 cache 23 after the restoration of the power supply of the L2 cache 23, acquires the data responding to the request concerned, and then notifies the CPU 10 of the completion of the read of data, the bus 90 will be in a locked state for a long time. Therefore, there is a problem that it becomes difficult for the CPU 10 or other bus masters (not shown) to quickly execute urgent processing accompanied by the bus access.

In order to solve this problem, in Embodiment 1, a bus error (an output of the read completion data indicating that the read of data has completed in error) which the L1 cache returns to the CPU generally when the read request from the CPU is inaccurate (for example, when the address indicated by the address data is inaccurate) is also generated when the L1 cache 21 is mishit in the state where the power supply of the L2 cache 23 is cut off. Consequently, the lock of the bus 90 by the CPU 10 is once released by the time of the power supply restoration of the L2 cache 23, thereby enabling other bus accesses by the bus master. Hereinafter, the operation thereof is explained in detail.

Figure 2:
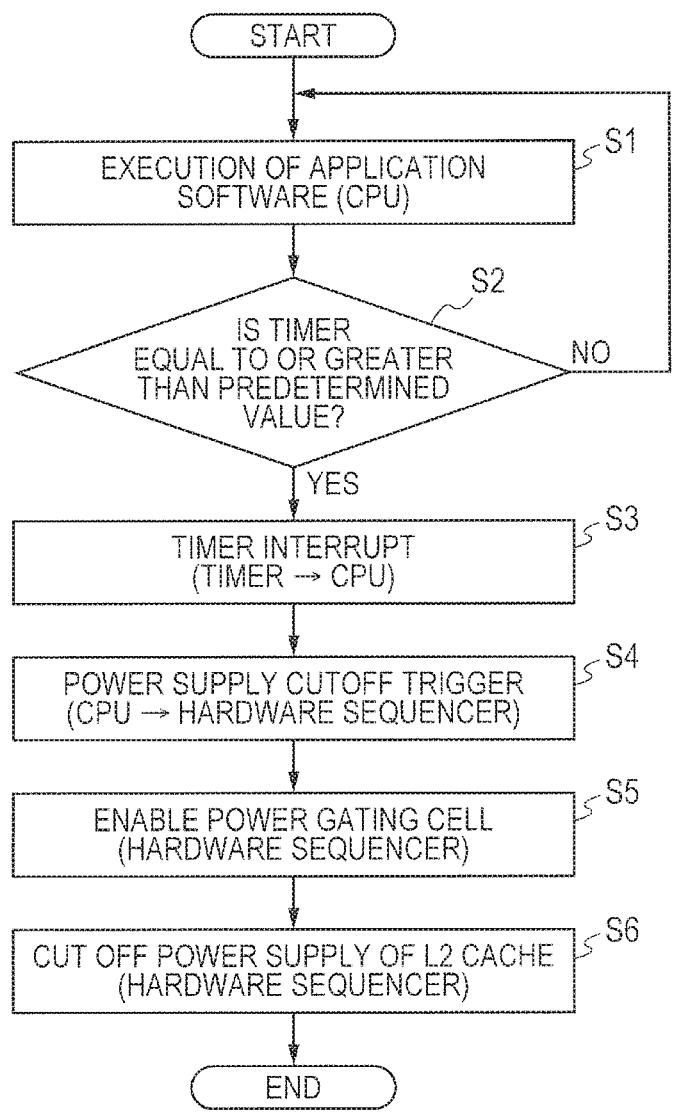
FIG. 2 is a flow chart illustrating an operation of the semiconductor device according to Embodiment 1 when the power supply of an L2 cache is cut off.

With reference to FIG. 2, the following explains the operation of the semiconductor device 1 according to Embodiment 1 at the time when the power supply of the L2 cache 23 is cut off.

The CPU 10 executes arbitrary application software which operates on the CPU 10, as a program described above (S1). The execution of this application program is continued while a value which the timer 40 counts is less than a value determined in advance (S2: NO). Here, this "value determined in advance" is a value set to the timer 40 as the time to measure, when the CPU 10 instructs the timer 40 to measure the time. That is, the execution of this application program is continued until the timer 40 measure the passage of the time set up by the CPU 10 and outputs a timer interrupt signal to the CPU 10.

Here, the method of any one of the following (1)-(4) may be used as the time for the CPU 10 to set up.
(1) A prescribed period of time from the activation completion time of the semiconductor device 1
(2) A prescribed period of time from the activation completion time of the application software
(3) A prescribed period of time from time of the last access made from the bus master to the memory subsystem 20
(4) A period of time by a prescribed time of day In the case of the method (1), the CPU 10 instructs the timer 40 to start the measurement of the prescribed period of time when the activation of the semiconductor device 1 has completed. "When the activation of the semiconductor device 1 has completed" may be when the CPU 10 starts the activation of the application software (when the activation of the application software is enabled) after the semiconductor device 1 is powered on, for example. Therefore, in this case, the timer 40 outputs a timer interrupt signal to the CPU 10, at the time when the prescribed period of time has passed from the time when the activation of the semiconductor device 1 has completed.

In the case of the method (2), the CPU 10 instructs the timer 40 to start the measurement of the prescribed period of time, when the activation of the application software has completed. Therefore, in this case, the timer 40 outputs a timer interrupt signal to the CPU 10, at the time when the prescribed period of time has passed from the time when the activation of the application software has completed.

In the case of the method (3), the memory subsystem 20 instructs the timer 40 to start the measurement of the prescribed period of time, at the time when there is access from the bus master (for example, the CPU 10) to the memory subsystem 20 itself. When there is another access to the memory subsystem 20 during the measurement of the lapse of the prescribed period of time by the timer 40, the memory subsystem 20 releases the current measurement of the time executed by the timer 40, and newly instructs the timer 40 to start the measurement of the prescribed period of time. Therefore, in this case, the timer 40 outputs a timer interrupt signal to the CPU 10, at the time when the prescribed period of time has passed from the last access from the bus master to the memory subsystem 20.

In the case of the method (4), the CPU 10 instructs to start the measurement of the time which is the difference from the current time of day to the prescribed time of day. Therefore, in this case, the timer 40 outputs a timer interrupt signal to the CPU 10 at the time when the time to the prescribed time of day has passed (at the prescribed time of day).

When the value which the timer 40 counts becomes equal to or greater than the value determined in advance (S2: YES), the timer 40 outputs a timer interrupt signal to the CPU 10 (S3). In response to the timer interrupt signal from the timer 40, the CPU 10 outputs to the hardware sequencer 30 a signal serving as a trigger of the power supply cutoff of the L2 cache 23 (S4). That is, this signal instructs the hardware sequencer 30 to cut off the power supply of the L2 cache 23.

In response to the signal from the CPU 10, the hardware sequencer 30 enables the power gating cell 22 (S5). Subsequently, the hardware sequencer 30 cuts off the power supply of the L2 cache 23 (S6).

According to the present device, when no access to the memory subsystem 20 by the CPU 10 takes place, the power supply of the L2 cache 23 is cut off; accordingly, it is possible to attain low power consumption of the memory subsystem 20. For example, when there is no access to the memory subsystem 20 from the CPU 10 for some period of time from the activation completion of the semiconductor device 1, the method (1) may be employed. During the activation of the application software, access to the memory subsystem 20 occurs frequently following the execution of various kinds of initializations. However, when the access frequency to the memory subsystem 20 is low after the activation is completed, the method (2) may be employed. According to the method (3), depending on the access situation to the memory subsystem 20 by the CPU 10, possible to reduce effectively the power consumption of the memory subsystem 20, when there is no access to the memory subsystem 20 from the CPU 10. When there is no access to the memory subsystem 20 from the CPU 10 for some period of time from the prescribed time of day, the method (4) may be employed.

Figure 3:
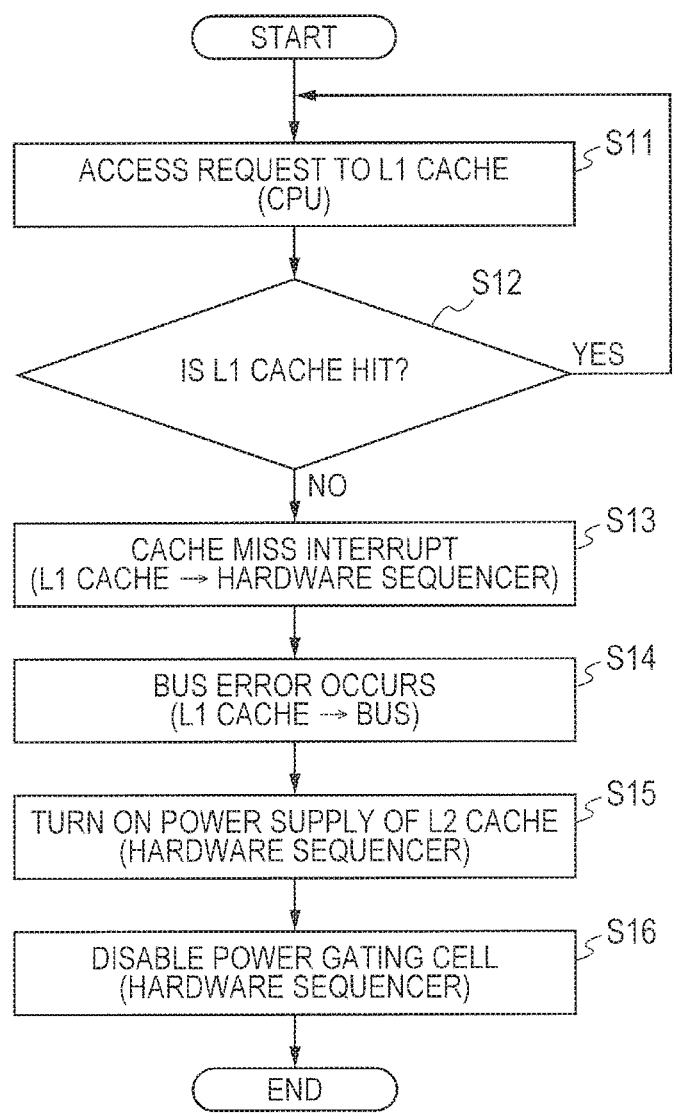
FIG. 3 is a flow chart illustrating an operation of the semiconductor device according to Embodiment 1 when the power supply of the L2 cache is restored.

With reference to FIG. 3, the following explains the operation of the semiconductor device 1 according to Embodiment 1 at the time of the power supply restoration of the L2 cache 23. That is, the operation shown in FIG. 3 is the operation to be performed after the power supply of the L2 cache 23 is cut off by the operation explained with reference to FIG. 2.

The CPU 10 issues an access request to the L1 cache 21 according to the execution of the application software (S11). That is, the CPU 10 requests the memory subsystem 20 for the read of data stored in a certain address in the main memory 24. When the L1 cache 21 is hit (S12: YES), the L1 cache 21 continues the operation, maintaining the power supply cutoff of the L2 cache 23.

On the other hand, when the L1 cache 21 is mishit (S12: NO), the L1 cache 21 outputs a cache miss interrupt signal to the hardware sequencer 30 (S13). In this case the L1 cache 21 generates a bus error to the bus 90, and terminates once the bus access from the CPU 10 (S14). Accordingly, the lock of the bus 90 by the CPU 10 is released.

Even in a case where a mishit occurs in the L1 cache 21, when the power supply of the L2 cache 23 is not cut off, the L1 cache 21 requests the L2 cache 23 for the read of data as described above.

The hardware sequencer 30 turns on the power supply of the L2 cache 23 according to the cache miss interrupt signal from the L1 cache 21 (S15). The hardware sequencer 30 disables the power gating cell 22 after completion of the power ON of the L2 cache 23 (S16). The hardware sequencer 30 outputs the cache miss interrupt signal to the CPU 10 responding to the cache miss interrupt signal from the L1 cache 21.

On the other hand, the CPU 10 receives the bus error generated by the L1 cache 21 via the bus 90, as a notice of the completion of the access request (the completion of the read of data). The CPU 10 generally retries the access request (request of read) responding to the bus error. However, in Embodiment 1, the CPU 10 confirms whether the cache miss interrupt signal is inputted, before retrying the access request. When the input of the cache miss interrupt signal is confirmed, the CPU 10 suppresses the retry of the access request and waits for the power ON of the L2 cache 23. After the power ON of the L2 cache 23, the CPU 10 locks the bus 90 and issues the access request to the L1 cache 21 anew. Accordingly, it is possible for the CPU 10 to access the data of the L2 cache 23 normally. The lock of the bus 90 is released until the power ON of the L2 cache 23 is performed. Accordingly, other bus accesses are possible.

Figure 4:
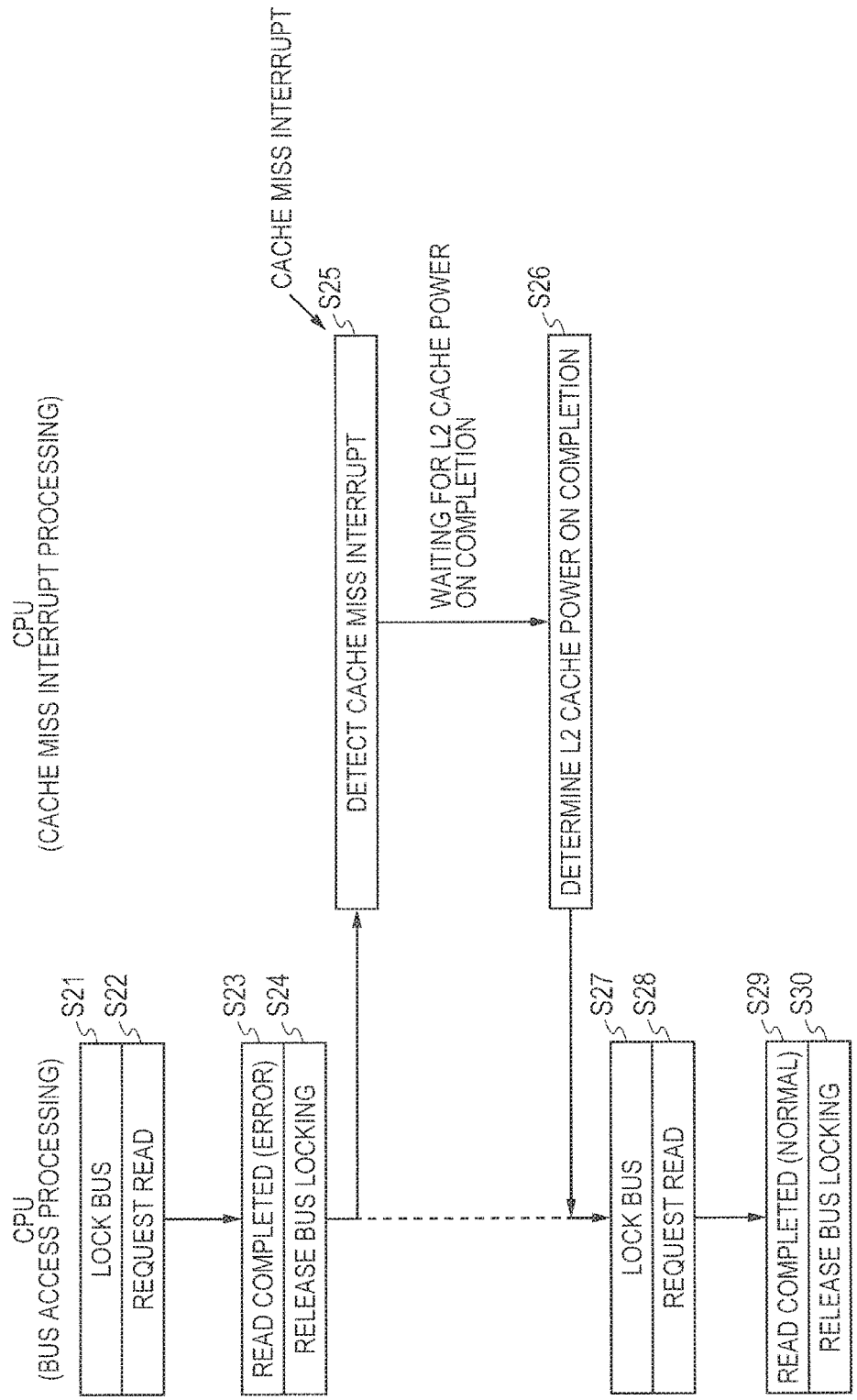
FIG. 4 is a flow chart illustrating an operation of a CPU according to Embodiment 1 when the power supply of the L2 cache is restored.

With reference to FIG. 4, the following explains the operation of the CPU 10 according to Embodiment 1 at the time of the power supply restoration of the L2 cache 23.

The CPU 10 locks the bus 90 before reading data from the memory subsystem 20 (S21). That is, the CPU 10 starts the output of the bus lock signal via the control line of the bus 90.

After the bus 90 is locked, the CPU 10 requests the memory subsystem 20 for the read of data (S22). That is, the CPU 10 outputs the address data indicative of the address of the data to read, to the memory subsystem 20 via the address line of the bus 90, and outputs the read request data to the memory subsystem 20 via the control line of the bus 90.

When the power supply of the L2 cache 23 is cut off and a mishit is detected, the L1 cache 21 outputs the read completion data indicating that the read of data has completed in error, as a bus error to the CPU 10 via the control line of the bus 90 (S23).

The CPU 10 releases the lock of the bus 90 responding to the read completion data from the L1 cache 21 (S24). That is, the CPU 10 terminates the output of the bus lock signal via the control line of the bus 90.

Before retrying the read request responding to the read completion data from the L1 cache 21 indicating that the read of data has completed in error, the CPU 10 confirms whether the cache miss interrupt signal is inputted from the hardware sequencer 30. When it is detected that the cache miss interrupt signal is inputted (S25), the CPU 10 waits for the power ON of the L2 cache 23.

Here, the method of any one of the following (1)-(3) may be used as the waiting of the power ON completion of the L2 cache (1) The CPU 10 waits by executing a loop processing for prescribed period of time.
(2) The CPU 10 executes polling to a register indicating the power ON.
(3) An interrupt signal is outputted to the CPU 10 at the time of the power ON.

In the case of the method (1), the CPU 10 repeats the processing to increment a counter as the loop processing, for example. Then, when the value of the counter reaches a prescribed threshold value, the CPU 10 determines that the power ON of the L2 cache 23 has completed, and escapes from the loop processing. That is, this prescribed threshold value is a value determined in advance so that the period of time during which the value of the counter reaches the prescribed threshold value may match the period of time to complete the power ON of the L2 cache 23.

In the case of the method (2), the CPU 10 confirms the value of the register indicating the power on/off state of the L2 cache 23 for every prescribed period of time. Then, the CPU 10 determines that the power ON of the L2 cache 23 has completed when the value of the register has changed from a value indicative of OFF of the power supply of the L2 cache 23 to a value indicative of ON of the power supply of the L2 cache 23.

This register may be included in the memory subsystem 20 (the L2 cache 23) or in the hardware sequencer 30. When this register is included in the memory subsystem 20 (the L2 cache 23), the memory subsystem 20 (the L2 cache 23) updates the value of the register to a value indicative of ON of the power supply of the L2 cache 23, when the power ON of the L2 cache 23 has completed. When this register is included in the hardware sequencer 30, on the other hand, the hardware sequencer 30 updates the value of the register to a value indicative of ON of the power supply of the L2 cache 23, when the power ON of the L2 cache 23 has completed.

In the case of the method (3), the CPU 10 determines that the power ON of the L2 cache 23 has completed when the interrupt signal to notify the power ON of the L2 cache 23 is inputted. This interrupt signal may be outputted by the memory subsystem 20 (the L2 cache 23) or by the hardware sequencer 30. When the memory subsystem 20 (the L2 cache 23) outputs this interrupt signal, the memory subsystem 20 (the L2 cache 23) outputs the interrupt signal to the CPU 10, when the power ON of the L2 cache 23 has completed. When the hardware sequencer 30 outputs this interrupt signal, on the other hand, the hardware sequencer 30 outputs the interrupt signal to the CPU 10, when the power ON of the L2 cache 23 has completed.

A multiple interruption may be employed as processing which realizes this in the CPU 10. For example, the CPU 10 may execute an endless loop processing with an interrupt handler responding to a cache miss interrupt signal, and may jump to an address outside the endless loop processing and execute processing explained henceforth with the interrupt handler responding to the interrupt signal from the memory subsystem 20 (the L2 cache 23) or the hardware sequencer 30.

When it determined that the power ON of the L2 cache 23 has completed (S26), the CPU 10 locks the bus 90 again before the read of data from the memory subsystem 20 (S27). After the bus 90 is locked, the CPU 10 requests the memory subsystem 20 for the read of data (S28).

The L1 cache 21 detects the mishit in the L1 cache 21 itself. However, the power supply of L2 cache 23 is ON this time, therefore, the read of data is requested to the L2 cache 23. Accordingly, the L1 cache 21 can acquire the data requested by the CPU 10 from the L2 cache 23 or the main memory 24. The L1 cache 21 outputs the acquired data to the CPU 10 via the data line, and outputs the read completion data indicating that the read has completed in normal to the CPU 10 via the control line (S29).

When the CPU 10 receives the input of the read completion data indicating that the read of data has completed in normal from the L1 cache 21 via the control line, the CPU 10 acquires the data inputted from the L1 cache 21 via the data line as the data read from the memory subsystem 20. Then, the CPU 10 releases the lock of the bus 90 responding to the read completion data from the L1 cache 21 (S30).

As explained above, the semiconductor device 1 according to Embodiment 1 includes the memory subsystem 20. The hardware sequencer 30, and the CPU 10. The memory subsystem 20 includes the L2 cache 23 in which data is stored, and the L1 cache 21 to which the data of the L2 cache 23 is cache d. The hardware sequencer 30 controls the power supply of the L2 cache 23. The CPU 10 is coupled to the memory subsystem 20 via the bus 90, and accesses the data of the memory subsystem 20 after locking the bus 90.

Then, when the power supply of the L2 cache 23 is cut off at the time of occurrence of a mishit in the L1 cache 21, the hardware sequencer 30 restores the power supply of the L2 cache 23, and the memory subsystem 20 outputs the response to the access to the CPU 10. The CPU 10 once releases the lock of the bus responding to the response from the memory subsystem 20, and reexecutes the access with the bus 90 locked, after restoring of the power supply of the L2 cache 23 has completed.

According to the present device, when the power supply of the L2 cache 23 is cut off, the lock of the bus 90 is once released until the power supply of the L2 cache 23 is restored, and other bus accesses can be executed to the bus 90. Accordingly, it is possible to realize the low power consumption of the memory by cutting off the power supply of the L2 cache 23, and at the same time, it is possible for the CPU 10 or other bus masters to execute urgent processing accompanied by a bus access more quickly.

After the power supply restoration of the L2 cache 23, the bus access by which the mishit has occurred in the L1 cache 21 is automatically reexecuted. Accordingly, it not necessary for a user or application software to perform any special operation or processing for reexecuting the bus access and it is possible to perform the normal operation as the stem.

In Embodiment 1, when an access from the CPU 10 is normal, the memory subsystem 20 outputs to the CPU 10 the normal completion data indicating that the access has completed in normal (the read completion data indicating that the read of data has completed in normal), as a response to the access. When an access from the CPU 10 is not normal, the memory subsystem 20 outputs to the CPU 10 the error completion data indicating that the access has completed in error (the read completion data indicating that the read of data has completed in error), as a response to the access. The CPU 10 releases the lock of the bus 90, when the normal completion data is inputted from the memory subsystem 20, and when the error completion data is inputted from the memory subsystem 20.

Then, the memory subsystem 20 transmits the error completion data to the CPU 10 as a response to be outputted when the power supple of the L2 cache 23 is cut off at the time of occurrence of the mishit in the L1 cache 21.

According to the present device, by diverting the ordinary response to the access to the memory subsystem 20 from the CPU 10, it is possible to execute simply the urgent processing accompanied by the bus access by the above-described bus master. Therefore, it is possible to reduce the man day necessary for implementing the configuration according to Embodiment 1 to the semiconductor device.

In Embodiment 1, the CPU 10 reexecutes the access when the error completion data is inputted from the memory subsystem 20.

Then, the memory subsystem 20 outputs the cache miss interrupt signal notifying the occurrence of a mishit of the L1 cache 21, when the power supply of the L2 cache 23 is cut off at the time of occurrence of the mishit in the L1 cache 21. The CPU 10 suppresses the reexecution of the access with the bus 90 locked until the completion of the restoration of the power supply of the L2 cache 23, when the cache miss interrupt signal is outputted from the memory subsystem 20, even when the error completion data is inputted from the memory subsystem 20.

According to the present device, it is possible to prevent the repeat of the output of the error completion data and the reexecution of the corresponding access, when the power supply of the L2 cache 23 is cut off at the time of occurrence of the mishit in the L1 cache 21.

Embodiment 2

Next, Embodiment 2 is explained. Hereinafter, the same symbol or reference numeral is attached to the same or corresponding element as in Embodiment 1, and the repeated explanation thereof will be omitted. First, with reference to FIG. 5, the configuration of a semiconductor device 1 according to Embodiment 2 is explained.

Figure 5:
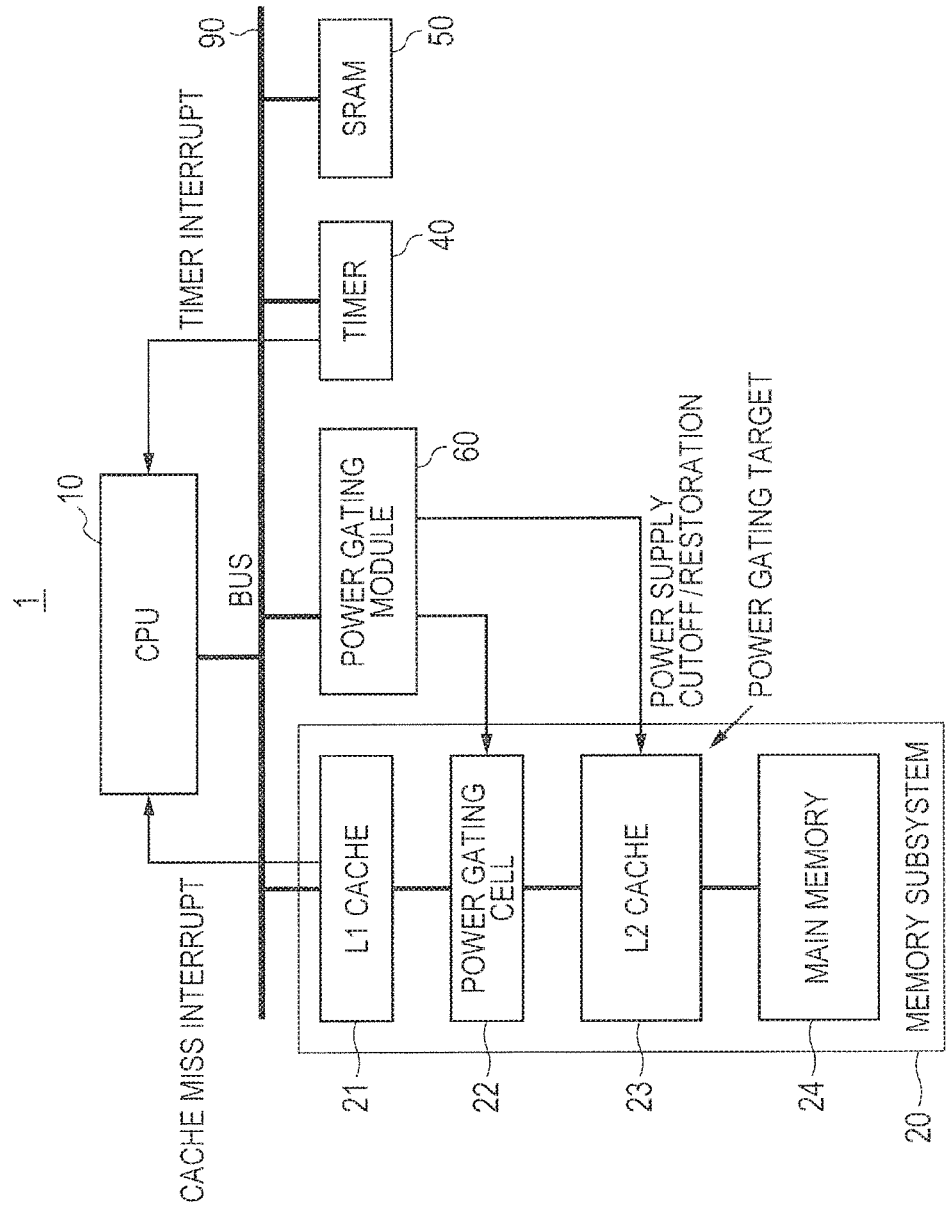
FIG. 5 is a drawing illustrating the configuration of a semiconductor device according to Embodiment 2.

As illustrated in FIG. 5, the semiconductor device 1 according to Embodiment 2 is different from the semiconductor device 1 according to Embodiment 1 in that a power gating module 60 is included in lieu of the hardware sequencer 30.

The feature of the configuration of the semiconductor device 1 according to Embodiment 2 is shown in the following.

Memory without power supply gating=L1 cache 21
Memory with power supply gating=L2 cache 23
Bus master=CPU 10
Power control module=CPU 10+SRAM 50+power gating module 60
Trigger of power supply cutoff=timer interrupt
Trigger of power supply restoration=cache miss interrupt That is, in Embodiment 1, the hardware sequencer 30 controls all the enabling of the power gating cell 22 and the power OFF of the L2 cache 23, responding to the trigger of the power supply cutoff from the CPU 10, and controls all the disabling of the power gating cell 22 and the power ON of the L2 cache 23, responding to the cache miss interrupt signal from the L1 cache 21. However, in Embodiment 2, the CPU 10 executes those kinds of control via the power gating module 60.

The power gating module 60 performs the control of the power on/off state of the L2 cache 23 and the control of the enabling/disabling state of the power gating cell 22, as is the case with the hardware sequencer 30. However, the power gating module 60 is different from the hardware sequencer 30 in that each control is performed responding to the instructions from the CPU 10.

In Embodiment 2, the CPU 10 controls the disabling of the power gating cell 22 and the power ON of the L2 cache 23 via the power gating module 60. Accordingly, the L1 cache 21 outputs the cache miss interrupt signal to the CPU 10, not to the power gating module 60.

Figure 6:
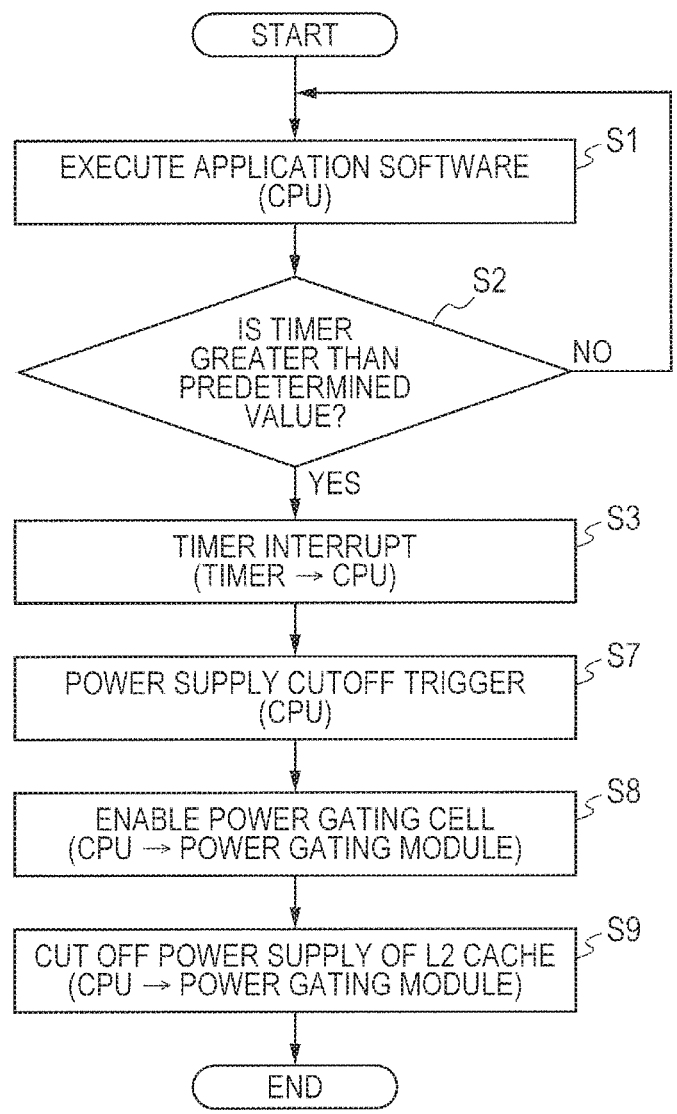
FIG. 6 is a flow chart which illustrates an operation of the semiconductor device according to Embodiment 2 when the power supply of the L2 cache is cut off.

With reference to FIG. 6, the following explains the operation of the semiconductor device 1 according to Embodiment 2 when the power supply of the L2 cache 23 is cut off.

Steps S1-S3 are same as those in Embodiment 1 (Steps S1-S3 illustrated in FIG. 2); accordingly, the explanation thereof is omitted. Here in Embodiment 2, the CPU 10 controls all the enabling of the power gating cell 22 and the power supply cutoff of the L2 cache 23. Accordingly, the CPU 10 receives the timer interrupt signal outputted at Step S3 as a signal serving as the trigger of the power supply cutoff of the L2 cache 23 (S7).

The CPU 10 outputs a signal which instructs the enabling of the power gating cell 22 to the power gating module 60 responding to the timer interrupt signal from the timer 40. The power gating module 60 enables the power gating cell 22 responding to the signal from the CPU 10 (S8).

The CPU 10 enables the power gating cell 22 and then outputs a signal which instructs the power supply cutoff of the L2 cache 23 to the power gating module 60. The power gating module 60 cuts off the power supply of the L2 cache 23 responding to the signal from the CPU 10 (S9).

Figure 7:
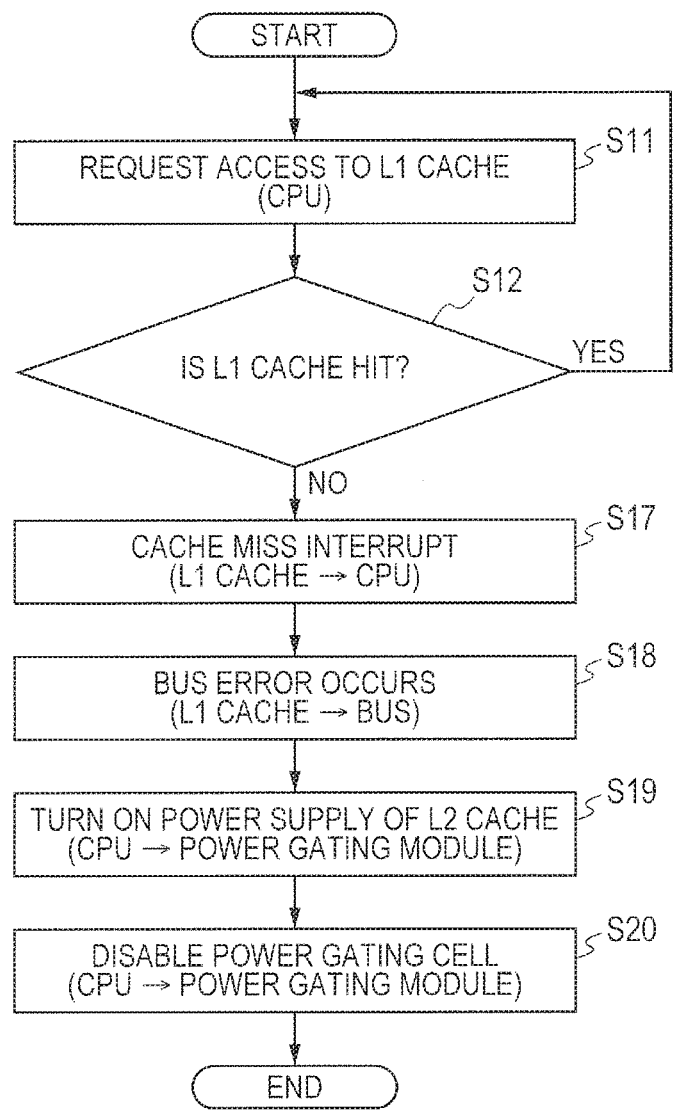
FIG. 7 is a flow chart illustrating an operation of the semiconductor device according to Embodiment 2 when the power supply of the L2 cache is restored.

Subsequently, with reference to FIG. 7, the following explains the operation of the semiconductor device 1 according to Embodiment 2 at the time of the power supply restoration of the L2 cache 23. That is, the operation illustrated in FIG. 7 is executed after the power supply of the L2 cache 23 is cut off by the operation explained with reference to FIG. 6.

Steps S11 and S12 are same as those in Embodiment 1 (Steps S11 and S12 illustrated in FIG. 3); accordingly, the explanation thereof is omitted. When a mishit occurs in the L1 cache 21 (S12: NO), the L1 cache 21 outputs a cache miss interrupt signal to the CPU 10 (S17). In this case, the L1 cache 21 generates a bus error to the bus 90, and once terminates the bus access from the CPU 10 (S18). Accordingly, the lock of the bus 90 by the CPU 10 is released.

The CPU 10 outputs a signal which instructs the power supply restoration of the L2 cache 23 to the power gating module 60, responding to the cache miss interrupt signal from the L1 cache 21. The power gating module 60 turns on the power supply of the L2 cache 23 responding to the signal from the CPU 10 (S19).

The CPU 10 turns on the power supply of the L2 cache 23 and then outputs a signal which instructs the disabling of the power gating cell 22 to the power gating module 60. The power gating module 60 disables the power gating cell 22 responding to the signal from the CPU 10 (S20).

The operation of the CPU 10 according to Embodiment 2 at the time of the power supply restoration of the L2 cache is the same as that of Embodiment 1 (the operation explained with reference to FIG. 4); accordingly, the explanation thereof is omitted. That is, in Embodiment 2, the CPU 10 instructs the power ON of the L2 cache 23 by itself, and waits for the power ON of the L2 cache 23.

As explained above, in Embodiment 2, the memory subsystem 20 outputs the cache miss interrupt signal to the CPU 10. The CPU 10 outputs the signal which instructs the power supply restoration of the L2 cache 23 to the power gating module 60, responding to the cache miss interrupt signal from the memory subsystem 20. Then, the power gating module 60 restores the power supply of the L2 cache 23 responding to the signal from, the CPU 10.

According to the present configuration, as the power gating module 60, it is sufficient to prepare the simple hardware which controls the power on/off state of the L2 cache 23 responding to the instruction from the CPU 10. Therefore, it is not necessary to prepare any special hardware which detects the occurrence of a mishit of the L1 cache 21 by itself and restores the power supply of the L2 cache 23. Accordingly, it is possible to reduce the man day necessary for implementing the configuration according to Embodiment 2 to the semiconductor device.

Embodiment 3

Next, Embodiment 3 is explained. Hereinafter, the same symbol or reference numeral is attached to the same or corresponding element as in Embodiment 1, and the repeated explanation thereof will be omitted. First, with reference to FIG. 8, the configuration of a semiconductor device 1 according to Embodiment 3 is explained.

Figure 8:
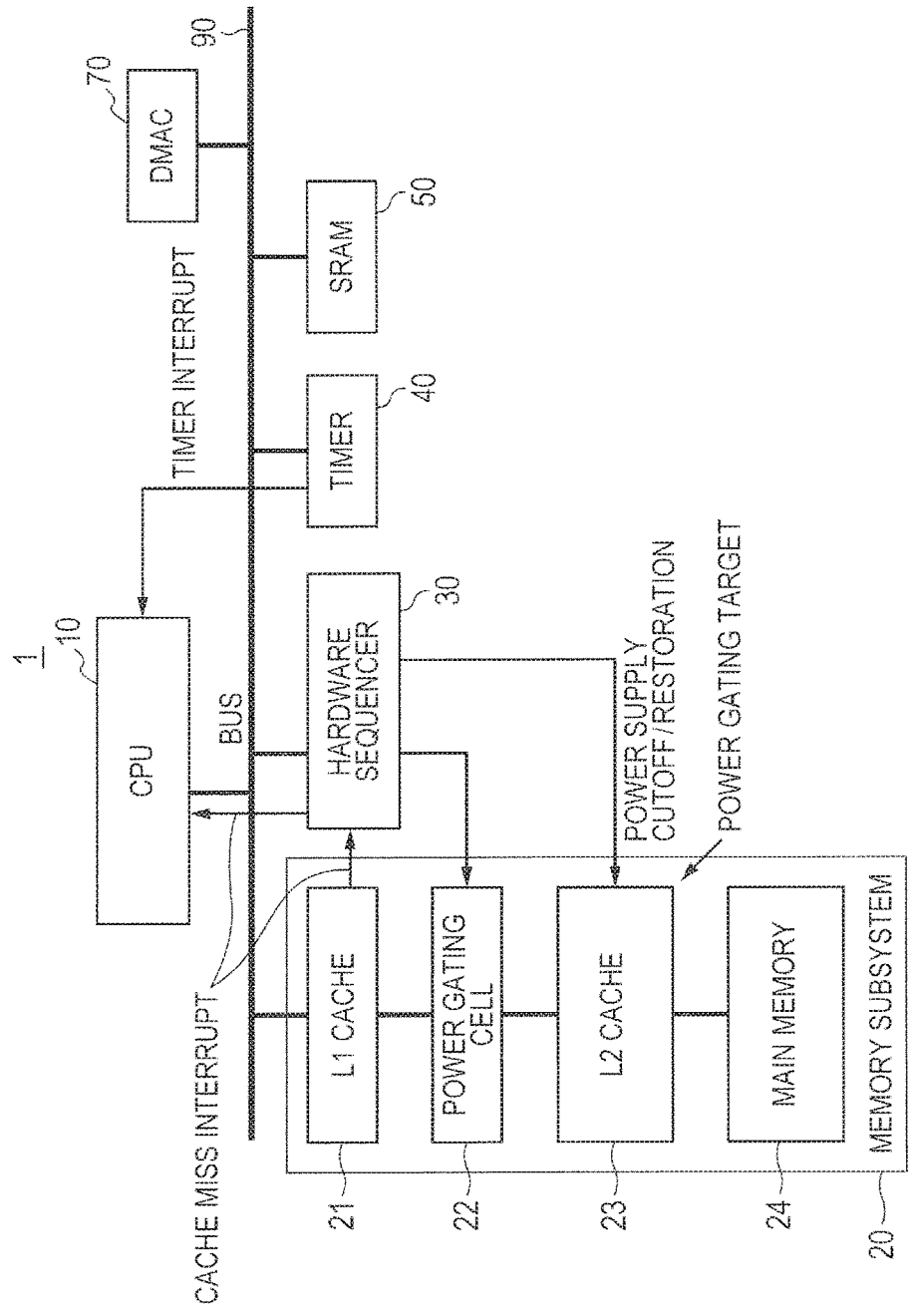
FIG. 8 is a drawing illustrating the configuration of a semiconductor device according to Embodiment 3.

As illustrated in FIG. 8, the semiconductor device 1 according to Embodiment 3 is different from the semiconductor device 1 according to Embodiment 1 in that a DMAC (Direct Memory Access Controller) 70 is further included. The DMAC 70 is coupled to the bus 90. The DMAC 70 is a bus master which accesses a bus slave via the bus 90, in the same manner as in the CPU 10.

The feature of the configuration of the semiconductor device 1 according to Embodiment 3 is shown in the following.
Memory without power supply gating=L1 cache 21
Memory with power supply gating=L2 cache 23
Bus master=CPU 10 and DMAC
Power control module=hardware sequencer 30
Trigger of power supply cutoff=timer interrupt
Trigger of power supply restoration=cache miss interrupt The DMAC 70 is a circuit which transfers the data stored in the memory subsystem 20 to other circuits coupled to the bus 90 responding to the instruction from the CPU 10. In the case of this transfer, the DMAC 70 requests the read of data in the main memory 24 to the memory subsystem 20 in the same manner as in the CPU 10.

That is, as described above, when requesting the read of data stored in a certain address in the main memory 24, the DMAC 70 outputs the address data indicative of the address to the memory subsystem 20 via the address line, and outputs the read request data indicative of requesting the read of data to the memory subsystem 20 via the control line.

When the read request data is inputted by the DMAC 70 via the control line, as described above, the L1 cache 21 performs the processing to acquire the data at the address indicated by the address data inputted from the DMAC 70 via the address line, from the L1 cache 21 itself, the L2 cache 23, or the main memory 24. The L1 cache 21 outputs the acquired data to the DMAC 70 via the data line, and outputs the read completion data indicating that the read of data has completed in normal to the DMAC 70 via the control line.

As is the case with the CPU 10, when the read completion data indicating that the read of data has completed in normal is inputted from the L1 cache 21 via the control line, the DMAC 70 acquires the data inputted from the L1 cache 21 via the data line as the data read from the memory subsystem 20. Then, the DMAC 70 transfers the acquired data to the circuit of the transfer destination.

Here, as is the case with the CPU 10, the DMAC 70 also locks the bus 90 from the time when the read request data outputted to the memory subsystem 20 until the read completion data is inputted from the memory subsystem 20. More specifically, the DMAC 70 starts the output of the bus lock signal via the control line before outputting the read request data, and terminates the output of the bus lock signal after the read completion data is inputted, Therefore, by making not only the CPU 10 but also the DMAC 70 generate the bus error (the output of the read completion data indicating that the read of data has completed in error), when the L1 cache 21 is mishit in the state where the power supply of the L2 cache 23 is cut off, the lock of the bus 90 by the DMAC 70 is once released by the time when the power supply of the L2 cache 23 is restored, and other bus accesses by the bus masters are enabled.

Next, the operation of the semiconductor device 1 according to Embodiment 3 is explained. The operation of the semiconductor device 1 according to Embodiment 3 at the time of the power supply cutoff of the L2 cache 23 is the same as that in Embodiment 1 (the operation explained with reference to FIG. 2); therefore, the explanation thereof is omitted.

Although the CPU 10 is replaced with the DMAC 70, the operation of the semiconductor device 1 according to Embodiment 3 at the time of the power supply restoration of the L2 cache 23 is the same as that in Embodiment 1 (the operation explained with reference to FIG. 3). Therefore, the explanation thereof is also omitted.

In Embodiment 1, the CPU 10 suppresses the reexecution of the access request until the power ON of the L2 cache 23 is completed, responding to the input of the cache miss interrupt signal. However, in Embodiment 3, the bus master (the CPU 10) to which the cache miss interrupt signal is inputted and the bus master (the DMAC 70) which reexecutes the access request are different. Therefore, in Embodiment 3, responding to the input of the cache miss interrupt signal, the CPU 10 controls the DMAC 70 to suppress the reexecution of the access request by the DMAC 70 until the power ON of the L2 cache 23 is completed. This control is explained in the following, with reference to FIG. 9.

Figure 9:
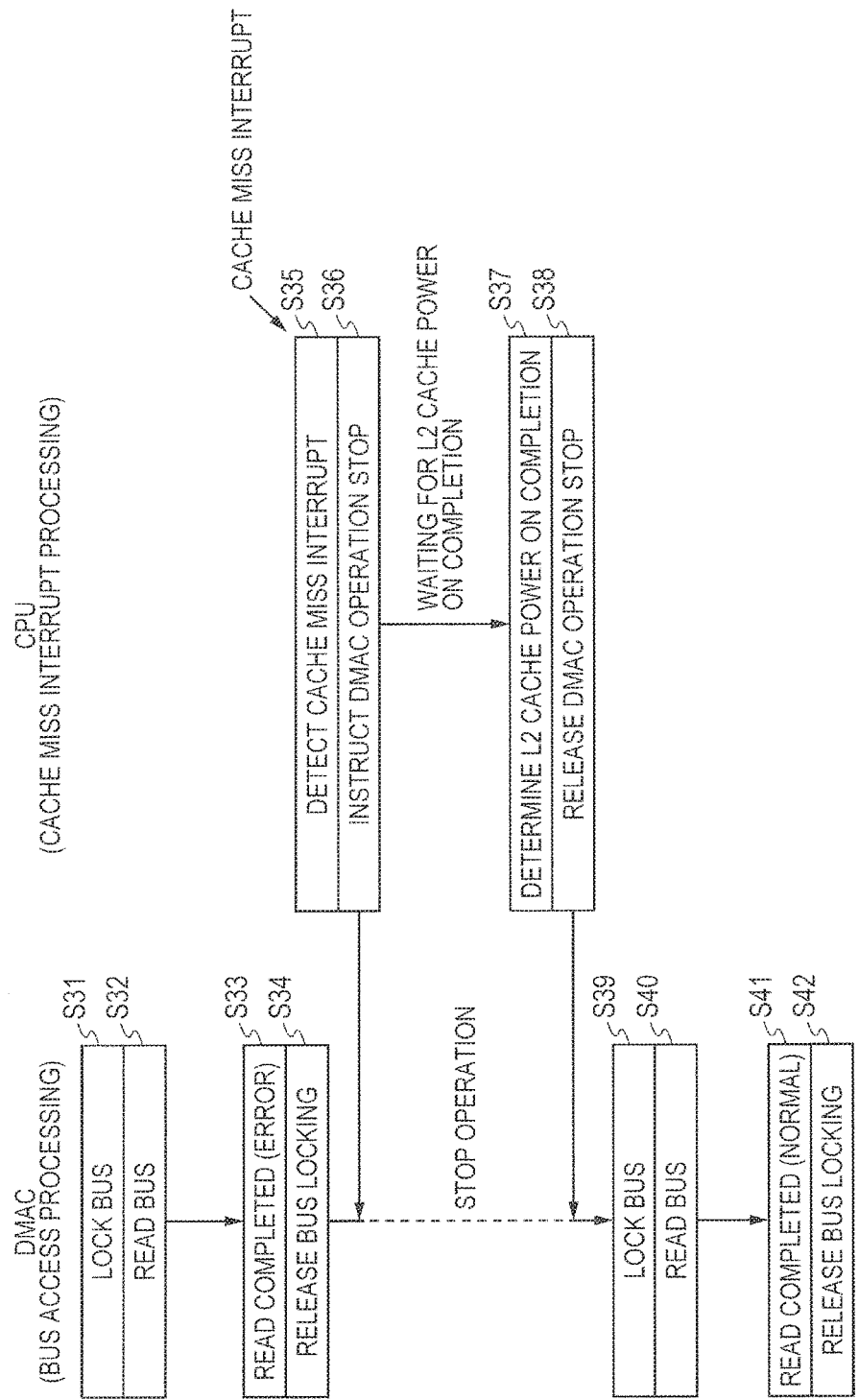
FIG. 9 is a flow chart illustrating an operation of a CPU according to Embodiment 3 when the power supply of the L2 cache is restored.

With reference to FIG. 9, the following explains the operation of the CPU 10 and the DMAC 70 according to Embodiment 3 at the time of the power supply restoration of the L2 cache 23.

Steps S31-S34 are the same as those in Embodiment 1 (Steps S21-S24 explained with reference to FIG. 4), except that the main body of operation is the DMAC 70 instead of the CPU 10. Accordingly, the explanation thereof is omitted.

Responding to the cache miss interrupt signal from the hardware sequencer 30 (S35), the CPU 10 starts the output of a signal instructing an operation stop to the DMAC 70 (S36). Before retrying the read request responding to the read completion data from the L1 cache 21 indicating that the read of data has completed in error, the DMAC 70 confirms whether the signal instructing an operation stop is inputted from the CPU 10, and stops the operation when the signal is inputted.

When it is determined that the power ON of the L2 cache 23 has completed, the CPU 10 (S37) terminates the output of the signal instructing the operation stop to the DMAC 70 (S38). The DMAC 70 resumes the operation (executes the operation of Steps S39-S42), when the signal instructing the operation stop is no longer inputted from the CPU 10.

Hereinafter, Steps S39-S42 are the same as those in Embodiment 1 (Steps S27-S30 explained with reference to FIG. 4), except that the main body of operation is the DMAC 70 instead of the CPU 10. Accordingly, the explanation thereof is omitted.

As explained above, in Embodiment 3, the memory subsystem 20 outputs the cache miss interrupt signal, when the power supply of the L2 cache 23 is cut off at the time of occurrence of the mishit in the L1 cache 21. When the cache miss interrupt signal is outputted from the memory subsystem 20, the CPU 10 suppresses the DMAC 70 to reexecute the access with the bus 90 locked, until the completion of the power supply restoration of the L2 cache 23.

According to the present device, when the power supply of the L2 cache 23 is cut off at the time of occurrence of the mishit in the L1 cache 21, even if the bus master which has caused the mishit of the L1 cache 21 is a dedicated hardware (the DMAC 70), it is possible for a general-purpose hardware (the CPU 10) to suppress the useless access by the DMAC 70 until the power supply restoration of the L2 cache 23 is completed and the normal access becomes possible. According to the present device, it is possible to enhance the transfer efficiency of the data from the memory by the DMAC 70, and at the same time, it is possible for the bus master to execute urgent processing accompanied by a bus access more quickly.

The above explanation in Embodiment 3 is made for the example in which the DMAC 70 and the operation stop control of the DMAC 70 by the CPU 10 is applied to Embodiment 1. However, it is not restricted to this. It is also preferable to apply the DMAC 70 and the operation stop control of the DMAC 70 by the CPU 10 to Embodiment 2.

Embodiment 4

Next, Embodiment 4 is explained. Hereinafter, the same symbol or reference numeral is attached to the same or corresponding element as in Embodiment 1, and the repeated explanation thereof will be omitted. First, with reference to FIG. 10, the configuration of a semiconductor device 1 according to Embodiment 4 is explained.

Figure 10:
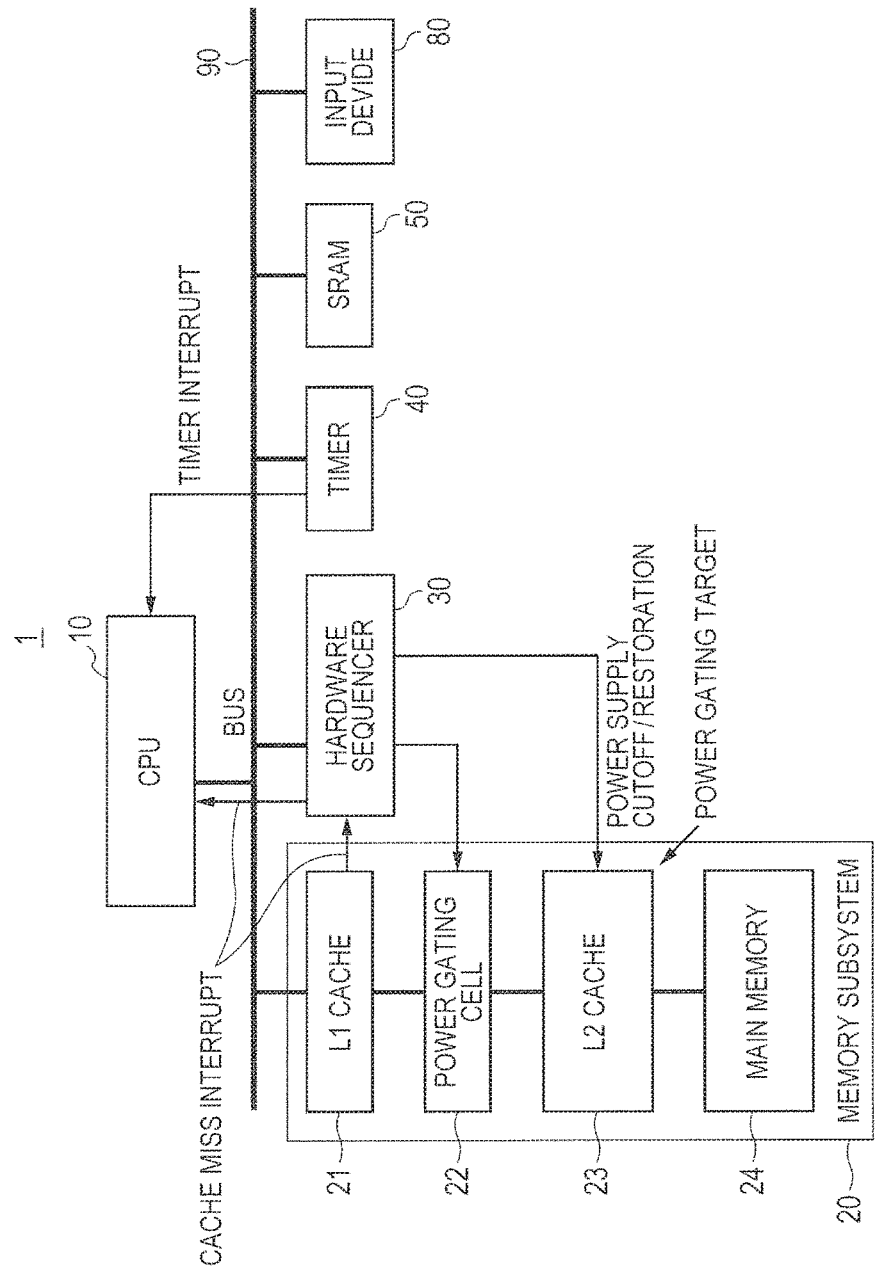
FIG. 10 is a drawing illustrating the configuration of a semiconductor device according to Embodiment 4.

As illustrated in FIG. 10, the semiconductor device 1 according to Embodiment 4 is different from the semiconductor device 1 according to Embodiment 1 in that an input device 80 is further included. The input device 80 is coupled to the bus 90.

The feature of the configuration of the semiconductor device 1 according to Embodiment 4 is shown in the following.
Memory without power supply gating=L1 cache 21
Memory with power supply gating=L2 cache 23
Bus master=CPU 10
Power control module=Hardware sequencer 30
Trigger of power supply cutoff=mode transition, instructions from a user, etc.
Trigger of power supply restoration=cache miss interrupt In Embodiment 4, the trigger of the power supply cutoff of the L2 cache 23 is not restricted to the trigger exemplified in Embodiment 1 (the trigger explained with reference to FIG. 2). That is, the trigger of the power supply cutoff of the 12 cache 23 is not restricted to the case where the value counted by the timer 40 exceeds the value determined in advance.

For example, it is preferable to define the mode transition of the semiconductor device 1 or the instruction from a user, as the trigger of the power supply cutoff of the L2 cache 23.

(1) The case where the mode transition of the semiconductor device 1 is defined as the trigger of the power supply cutoff of the L2 cache 23.

For example, the mode of the semiconductor device 1 makes a transition between the normal operation mode in which the prescribed operation is executed, and the power saving mode in which the prescribed operation is stopped and the power supply of the L2 cache 23 is cut off.

When the semiconductor device 1 is implemented in an information processing device, for example, in the normal operation mode, the prescribed operation may be such that the CPU 10 collects the information in an information processing device by means of a sensor installed in the information processing device and stores the information in the SRAM 50 or the memory subsystem 20. In this case, the CPU 10 operates in the normal operation mode for a prescribed period of times for every certain time interval for example, and operates in the power saving mode for the other period of times.

When the semiconductor device 1 is implemented in a wearable computer, for example, in the normal operation mode, the prescribed operation may be such that the CPU 10 detects the motion of a user by means of a sensor installed in the wearable computer and stores the information on the detected motion in the SRAM 50 or the memory subsystem 20. In this case, the CPU 10 makes a transition to the normal operation mode, when the sensor detects the motion of the user, for example, and makes a transition to the power saving mode, when the motion of the user is not detected by the sensor for a prescribed period of times.

When the semiconductor device 1 is implemented in electrical household appliances and electrical equipment, for example, in the normal operation mode, the prescribed operation may be the operation as the electrical household appliances and electrical equipment (for example, an electric rice-cooker is cooking rice). In this case, the CPU 10 operates in the normal operation mode, for example, when executing the operation as the electrical household appliances and electrical equipment, and operates in the power saving mode after that operation ends.

Then, in these operations, when the mode makes a transition from the normal operation mode to the power saving mode, the CPU 10 outputs the signal serving as the trigger of the power supply cutoff of the L2 cache 2 to the hardware sequencer 30, and the power supply of the L2 cache 23 is cut off.

(2) The case where the instruction from a user is defined as the trigger of the power supply cutoff of the L2 cache 23.

When an instruction of the power supply cutoff of the L2 cache 23 is inputted to the input device 80 from a user, the CPU 10 outputs a signal serving as the trigger of the power supply cutoff of the L2 cache 23 to the hardware sequencer 30, and cuts off the power supply of the L2 cache 23.

The input device 80 generates a signal indicative of the contents inputted by the user, and outputs it to the CPU 10. The CPU 10 recognizes the contents inputted by the user based on the signal inputted from the input device 80. Then, when the contents inputted by the user are an instruction of the power supply cutoff of the L2 cache 23, the CPU 10 cuts off the power supply of the L2 cache 23, as described above. The input device 80 may employ any one of a keyboard, a mouse, a touch panel, or a button. For example, when the semiconductor device 1 is implemented in a PC, the input device 80 may employ a keyboard and a mouse, and when the semiconductor device 1 is implemented in a Smartphone, the input device 80 may employ a touch panel or a button.

As explained above, the trigger of the power supply cutoff of the L2 cache 23 is not restricted to the timer interrupt signal from the timer 40, but may be a mode transition (transition from the normal operation mode to the power saving mode) or an instruction from a user.

The above explanation is made for the example as Embodiment 4, in which the input device 80 and the trigger of the power supply cutoff of the L2 cache 23 with the additional use of the mode transition and the instruction from a user are applied to Embodiment 1. However, the example is not restricted to this. The input device 80 and the trigger of the power supply cutoff of the L2 cache 23 with the additional use of the mode transition and the instruction from a user may be applied to Embodiment 2.

Embodiment 5

Next, Embodiment 5 is explained. Hereinafter, the same symbol or reference numeral is attached to the same or corresponding element as in Embodiment 1, and the repeated explanation thereof will be omitted. First, with reference to FIG. 11, the configuration of a semiconductor device 1 according to Embodiment 5 is explained.

Figure 11:
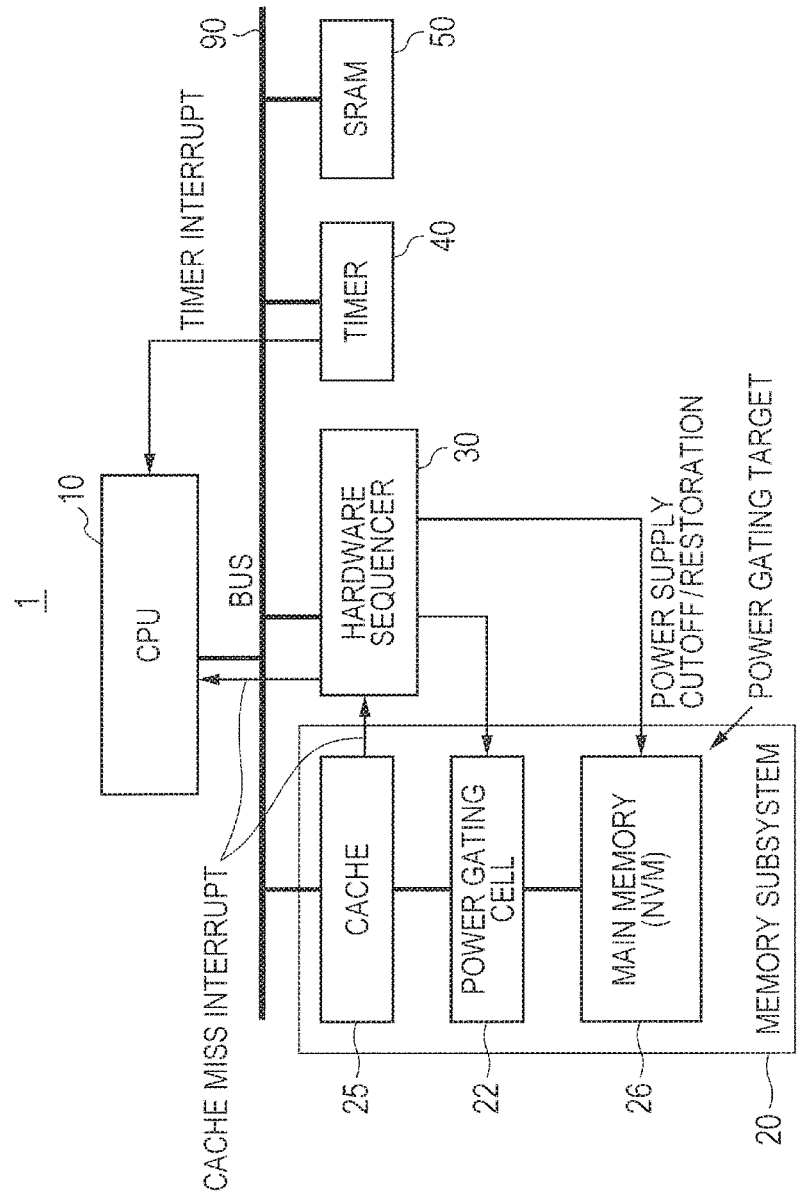
FIG. 11 is a drawing illustrating the configuration of a semiconductor device according to Embodiment 5.

As illustrated in FIG. 11, the semiconductor device 1 according to Embodiment 5 is different from the semiconductor device 1 according to Embodiment 1 in that a cache 25 and a main memory 26 are included in lieu of the L1 cache 21 and the L2 cache 23, respectively, and not including the main memory 24. That is, in Embodiment 5, the memory subsystem 20 includes the power gating cell 22, the cache 25, and the main memory 26.

The feature of the configuration of the semiconductor device 1 according to Embodiment 5 is shown in the following.
Memory without power supply gating=L1 cache 25
Memory with power supply gating=main memory 26
Bus master=CPU 10
Power control module=hardware sequencer 30
Trigger of power supply cutoff=timer interrupt
Trigger of power supply restoration=cache miss interrupt The operation of the semiconductor device 1 according to Embodiment 5 is the same as the operation of the semiconductor device 1 according to Embodiment 1 except that the L1 cache 21 and the L2 cache 23 are replaced with the cache 25 and the main memory 26, respectively. Accordingly, the explanation thereof is omitted.

However, in Embodiment 5, the main memory 26 works as a lowest level memory. Accordingly, naturally, no mishit occurs in the main memory 26, in contrast to the L2 cache 23. The power supply of the main memory 26 will be cut off. Accordingly, the main memory 26 employs a nonvolatile memory (NVM) so that the data stored in it may not vanish even when the power supply is cut off.

As explained above, in Embodiment 5, the lowest level main memory which does not cache the data of other memories is employed as the memory of which the power supply is cut off.

When compared with a cache memory which caches the data of a main memory, the main memory as described above has a large capacity and takes long time for the power supply restoration to complete when the power supply restoration is performed again after the power supply cutoff. Therefore, when the cache 25 is mishit, if the bus access is not completed until the power supply of the main memory 26 is restored, the period when the bus 90 is locked also becomes very long. Accordingly, there arises a problem that the period when the urgent processing accompanied by other bus accesses cannot be executed also becomes very long.

As opposed to this, according to Embodiment 5, it is possible to release once the lock of the bus 90 by the time when the power supply of the main memory 26 is restored, as explained in Embodiments 1-4. Accordingly, it is possible to solve the above-described problem. That is, as explained in Embodiment 5, when the memory having a large capacity and a long period of the power supply restoration is set as a power gating target, it becomes possible to greatly reduce the period when the urgent processing accompanied by other bus accesses cannot be executed; accordingly, a more prominent effect can be produced.

The above explanation is made for the example that the main memory 26 is a nonvolatile memory; however, the main memory 26 is not restricted to the example. The main memory 26 may be a volatile memory (for example, a DRAM, an SRAM, etc.). However, in this case, when the power supply of the main memory 26 is cut off, data will vanish. Accordingly, it is necessary for the CPU 10 to evacuate the data to other nonvolatile memories included in the semiconductor device 1 before performing the power supply cutoff, and to restore the data to the main memory 26 from the nonvolatile memory after the power supply restoration. Therefore, more preferably, by employing a nonvolatile memory as the main memory 26, it is possible to make such processing unnecessary and to reduce the processing load of the CPU 10.

The above explanation is made for the example as Embodiment 5, in which the cache 25 and the main memory 26 are applied to Embodiment 1. However, the example is not restricted to this. The cache 25 and the main memory 26 may be applied to Embodiment 2.

The Outline Configuration of Embodiments

Figure 12:
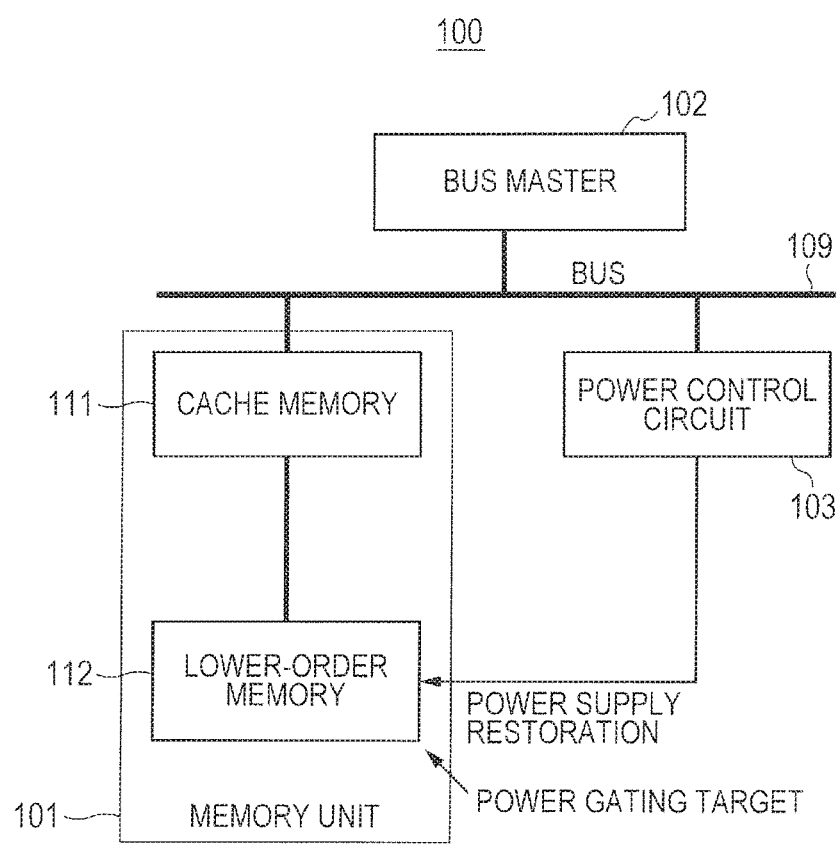
FIG. 12 is a drawing illustrating the outline configuration of a semiconductor device according to an embodiment.

With reference to FIG. 12, the following explains the configuration of a semiconductor device 100 as the outline configuration of the semiconductor device 1 according to Embodiments 1-5 described above. That is, a part of the characteristic configuration of the semiconductor device 1 according to Embodiments 1-5 can be extracted as illustrated in FIG. 12.

As illustrated in FIG. 12, the semiconductor device 100 includes a memory unit 101, a bus master 102, and a power control circuit 103. The memory unit 101 corresponds to the memory subsystem 20, the bus master 102 corresponds to each of the CPU 10 and the DMAC 70, and the power control circuit 103 corresponds to each of the hardware sequencer 30 and the power gating module 60.

The memory unit 101 includes a lower-order memory 112 to store data and a cache memory 111 to cache the data stored in the lower-order memory 112. The power control circuit 103 controls the power supply of the lower-order memory 112. The bus master 102 is coupled to the memory unit 101 via a bus 109, locks the bus 109, and accesses the data of the memory unit 101. The cache memory 111 corresponds to the L1 cache 21, the lower-order memory 112 corresponds to the L2 cache 23, and the bus 109 corresponds to the bus 90.

Then, when the power supply of the lower-order memory 112 is cut off at the time of occurrence of the mishit in the cache memory 111, the power control circuit 103 restores the power supply of the lower-order memory 112, and the memory unit 101 outputs to the bus master 102 a response to the access. The bus master 102 once releases the lock of the bus according to the response from the memory unit 101, and reexecutes the access with the bus 109 locked, after the power supply restoration of the lower-order memory 112 is completed.

According to the present device, when the power supply of the lower-order memory 112 is cut off, the lock of the bus 109 is once released and other bus accesses can be executed to the bus 109, until the power supply of the lower-order memory 112 is restored. Accordingly, it is possible to cut off the power supply of the lower-order memory 112 and to realize the low power consumption of the memory, and at the same time, it is possible for the bus master 102 or other bus masters to execute urgent processing accompanied by a bus access more quickly.

After the power supply restoration of the lower-order memory 112, the bus access by which the mishit has occurred in the cache memory 111 is reexecuted automatically. Accordingly, it is unnecessary for a user or application software to perform any special operation or processing in order to reexecute the bus access, enabling to perform the normal operation as the system.

Here, the above-described program executed by the CPU 10 can be stored using various types of non-transitory computer readable media, and can be supplied to the computer implemented in the semiconductor device 1. The non-transitory computer readable media include various types of tangible storage media. The example of the non-transitory computer readable medium includes a magnetic recording medium (for example, a flexible disk, a magnetic tape, and a hard disk drive), an optical magnetic recording medium (for example, a magneto-optical disk), a CD-ROM (Read Only Memory), a CD-R, a CD-R/W, and a semiconductor memory (for example, a mask ROM, a PROM (a programmable ROM), an EPROM (an erasable PROM), a flash ROM, an RAM (Random Access Memory)). The program may be supplied to a computer by various types of transitory computer readable media. The example of a transitory computer readable medium includes an electrical signal, a light signal, and electromagnetic waves. The transitory computer readable medium can supply a program to a computer via a wired communication path, such as an electric wire and an optical fiber, or a wireless communication path.

As described above, the invention accomplished by the present inventors has been concretely explained based on the embodiments. However, it cannot be overemphasized that the present invention is not restricted to the embodiments as described above, and it can be changed variously in the range which does not deviate from the gist.

For example, in Embodiment 1 and Embodiments 3-5, the explanation is made for the example in which the L1 cache 21 outputs the cache miss interrupt signal to the hardware sequencer 30, and the hardware sequencer 30 outputs the cache miss interrupt signal to the CPU 10 responding to the cache miss interrupt signal. However, the example is not restricted to this. The L1 cache 21 may outputs the cache miss interrupt signal to the hardware sequencer 30 and the CPU 10, and the hardware sequencer 30 may not output the cache miss interrupt signal to the CPU 10.

For example, in Embodiments 1-5, the explanation is made for the example in which the timer 40 outputs the timer interrupt signal to the CPU 10, and the CPU 10 instructs the hardware sequencer 30 to cut off the power supply of the L2 cache 23 responding to the timer interrupt signal. However, the example is not restricted to this. The timer 40 may output the timer interrupt signal to the hardware sequencer 30, and the hardware sequencer 30 may cut off the power supply of the L2 cache 23 responding to the timer interrupt signal.

What is claimed is:

1. A semiconductor device comprising:
   a memory unit comprising a lower-order memory to store data and a cache memory to cache the data stored in the lower-order memory;
   a power control circuit to control power supply of the lower-order memory; and
   a bus master coupled to the memory unit via a bus and to access the data stored in the memory unit after locking the bus,
   wherein in response to a determination that the power supply of the lower-order memory is in an off state at the time of occurrence of a mishit of the cache memory, the power control circuit restores the power supply of the lower-order memory and the memory unit outputs to the bus master a response to an access by the bus master to the data stored in the memory unit, and
   wherein the bus master releases lock of the bus according to the response from the memory unit and reexecutes the access with the bus locked, after the restoration of the power supply of the lower-order memory is completed.

2. The semiconductor device according to claim 1,
   wherein in response to a determination that the access from the bus master is normal, the memory unit outputs, to the bus master, normal completion data indicating that the access has completed as a response to the access; and in response to a determination that the access from the bus master is not normal, the memory unit outputs, to the bus master, error completion data indicative of the error completion of the access as a response to the access,
   wherein after the bus master receives the normal completion data from the memory unit or after the bus master receives the error completion data as the response from the memory unit, the bus master releases the lock of the bus, and
   wherein in response to a determination that the mishit of the cache memory occurs and the power supply of the lower-order memory is in the off state, the memory unit outputs the error completion data to the bus master as a response.

3. The semiconductor device according to claim 2,
   wherein in response to a determination that the error completion data is output from the memory unit, the bus master reexecutes the access,
   wherein in response to a determination that the power supply of the lower-order memory is in the off state at the time of occurrence of the mishit of the cache memory, the memory unit outputs a cache miss interrupt signal, and
   wherein in response to a determination that the cache miss interrupt signal is output from the memory unit and the error completion data is output from the memory unit, the bus master suppresses the reexecution of the access with the bus locked until the completion of restoration of the power supply of the lower-order memory.

4. The semiconductor device according to claim 3,
   wherein the memory unit outputs the cache miss interrupt signal to the power control circuit,
   wherein the power control circuit restores the power supply of the lower-order memory according to the cache miss interrupt signal from the memory unit and outputs the cache miss interrupt signal to the bus master, and
   wherein the bus master recognizes the output of the cache miss interrupt signal from the memory unit by receiving the cache miss interrupt signal from the power control circuit.

5. The semiconductor device according to claim 3,
   wherein the memory unit outputs the cache miss interrupt signal to the bus master,
   wherein the bus master recognizes the output of the cache miss interrupt signal from the memory unit by receiving the cache miss interrupt signal from the memory unit and outputs, to the power control circuit, a signal indicative of the restoration of the power supply of the lower-order memory, according to the cache miss interrupt signal inputted from the memory unit, and
   wherein the power control circuit restores the power supply of the lower-order memory according to the signal from the bus master.

6. The semiconductor device according to claim 1,
   wherein the bus master is a DMA controller,
   wherein the semiconductor device further comprises a CPU,
   wherein in response to a determination that the power supply of the lower-order memory is in the off state at the time of occurrence of the mishit of the cache memory, the memory unit outputs a cache miss interrupt signal, and
   wherein in response to a determination that a cache miss interrupt signal is outputted from the memory unit, the CPU deters the DMA controller from reexecuting the access with the bus locked until the completion of restoration of the power supply of the lower-order memory.

7. The semiconductor device according to claim 4,
   wherein when the time set in advance as time until the completion of the restoration of the power supply of the lower-order memory since the input of the cache miss interrupt signal outputted from the power control circuit has elapsed, the bus master assumes that the restoration of the power supply of the lower-order memory has completed and reexecutes the access with the bus locked.

8. The semiconductor device according to claim 1,
   wherein the semiconductor device further comprises a timer to measure a lapse of the time specified by the bus master and to output a timer interrupt signal to the bus master when the specified time concerned has elapsed,
   wherein the bus master instructs the power control circuit to cutoff the power supply of the lower-order memory, according to the timer interrupt signal from the timer, and
   wherein the power control circuit cuts off the power supply of the lower-order memory, according to the instruction from the bus master.

9. The semiconductor device according to claim 1,
   wherein the lower-order memory is a main memory.

10. The semiconductor device according to claim 9,
    wherein the main memory is a nonvolatile memory.

11. A memory access control method comprising the steps of:
    making a bus master access data stored in a memory unit after locking a bus, the bus master being coupled, via the bus, to the memory unit comprising a lower-order memory to store data and a cache memory to cache data stored in the lower-order memory;

in response to a determination that power supply of the lower-order memory is in an off state at the time of occurrence of a mishit of the cache memory, restoring the power supply of the lower-order memory;

making the memory unit transmit to the bus master a response to an access by the bus master to the data stored in the memory unit; and making the bus master release the lock of the bus according to the response from the memory unit and reexecute the access with the bus locked, after the restoration of the power supply of the lower-order memory is completed.

* * * * *